(12) United States Patent
Steele et al.

(10) Patent No.: US 8,958,900 B2
(45) Date of Patent: *Feb. 17, 2015

(54) CONTROL SYSTEM CONFIGURATION FOR LINKING TO MACHINERY MONITORING SYSTEM

(71) Applicant: CSI Technology, Inc., Wilmington, DE (US)

(72) Inventors: Kevin D. Steele, Knoxville, TN (US); Anthony J. Hayzen, Knoxville, TN (US); Michael D. Rich, Powell, TN (US); Deane M. Horn, Knoxville, TN (US)

(73) Assignee: CSI Technology, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/911,522

(22) Filed: Jun. 6, 2013

(65) Prior Publication Data

US 2013/0268099 A1 Oct. 10, 2013

Related U.S. Application Data

(63) Continuation of application No. 12/874,577, filed on Sep. 2, 2010, now Pat. No. 8,463,417.

(51) Int. Cl.
*G06F 19/00* (2011.01)
*G05B 19/04* (2006.01)
*G05B 23/02* (2006.01)

(52) U.S. Cl.
CPC .......... *G05B 19/04* (2013.01); *G05B 23/0216* (2013.01); *G05B 2219/32403* (2013.01)
USPC ............... 700/108; 700/104; 700/96; 700/10

(58) Field of Classification Search
USPC ................ 700/10, 9, 19, 29, 104, 108–109; 702/187, 188; 706/10–11, 58
See application file for complete search history.

(56) References Cited

U.S. PATENT DOCUMENTS

| 4,975,865 | A | | 12/1990 | Carrette et al. |
| 5,068,778 | A | * | 11/1991 | Kosem et al. ................. 700/9 |
| 6,192,325 | B1 | | 2/2001 | Piety et al. |
| 6,529,780 | B1 | | 3/2003 | Soergel et al. |

(Continued)

OTHER PUBLICATIONS

Emerson Process Management, Database User Guide for Ovation 31 OW310_15, Version 1, May 2007, pp. 1-45.

(Continued)

*Primary Examiner* — Kidest Bahta
(74) *Attorney, Agent, or Firm* — Luedeka Neely Group, P.C.

(57) ABSTRACT

A method for importing data from a first system into a second system includes receiving configuration information about data storage structures in the first and second systems and information about communicating with the first and second systems. Information to be used in creating an import configuration file is entered via a user interface. The import configuration file is for use in preparing the second system to receive data from the first system. Based on the information about data storage structures, the information about communicating with the first and second systems, and the information entered via the user interface, the import configuration file is created to prepare the second system to receive data from the first system. Based on the import configuration file, data is transferred from the first system into the second system.

7 Claims, 10 Drawing Sheets

(56) References Cited

U.S. PATENT DOCUMENTS

| | | | |
|---|---|---|---|
| 6,775,576 B2 | 8/2004 | Spriggs et al. | |
| 7,467,018 B1 * | 12/2008 | Callaghan | 700/1 |
| 7,525,443 B2 | 4/2009 | Littrell | |
| 7,680,803 B2 * | 3/2010 | Salomon et al. | 707/999.1 |
| 7,715,930 B2 | 5/2010 | Bush et al. | |
| 2005/0143957 A1 | 6/2005 | Kauppila et al. | |
| 2005/0154542 A1 * | 7/2005 | Frerichs et al. | 702/56 |
| 2009/0182460 A1 | 7/2009 | O'Neal et al. | |
| 2010/0037237 A1 * | 2/2010 | Reinart | 719/313 |

OTHER PUBLICATIONS

Emerson Process Management, CSI 6910, Part MHM-97426 Rev. 1, Mar. 17, 2008, pp. 1-51.

Emerson Process Management, CSI 6000 System Operating manual, Shaft Displacement Monitor CSI 6110, Part No. MHM-97415 Rev. 1, Apr. 14, 2008, pp. 1-112.

Emerson Process Management, Ovation Record types Reference Manual Ref-1140, May 2009, pp. 1-307.

* cited by examiner

CONTROL SYSTEM CONFIGURATION FOR LINKING TO MACHINERY MONITORING SYSTEM

This application claims priority as a continuation of U.S. patent application Ser. No. 12/874,577 filed Sep. 2, 2010, titled METHOD AND APPARATUS TO CONFIGURE CONTROL SYSTEM LINK TO MACHINERY MONITORING SYSTEM, the entire contents of which are incorporated herein by reference.

FIELD

This invention relates to the communication of information between a system that monitors machine parameters, such as a machinery monitoring system, and a system that controls machine functions, such as a machinery control system. More particularly, this invention relates to a system for efficiently generating configuration information to enable well integrated communication of data between a machinery monitoring system and a machinery control system.

BACKGROUND

Generally, a "machinery control system" is a system having the primary function of controlling one or more machines, such as in an industrial plant, and which may monitor some machine performance parameters in the process of performing its primary function. A "machinery monitoring system" is a system having the primary function of measuring and monitoring performance parameters of one or more machines, and which may perform some machinery control operations in the process of performing its primary function. Examples of machine performance include the following: machine reliability, operator safety, machine protection, machine status, and machine condition.

One example of a machinery control system is the DeltaV™ distributed control system offered by Emerson Process Management. The DeltaV™ system uses computer hardware as user interfaces which are connected by a digital data link to controllers and I/O modules distributed throughout a process plant or factory to control industrial processes.

One example of a machinery monitoring system is the CSI 6500 series of machine health monitors offered by CSI Technologies, Inc. These include various types of machine parameter sensors, such as for sensing vibration, displacement, temperature, and pressure. These sensors are connected to communication modules which are connected to a communication bus. Computers connected to the communication bus monitor the output of the various sensors and, based on the sensor signals, determine whether the machines are operating within acceptable limits or whether a fault condition is indicated. Such systems are often used for protection shutdown and predictive analysis.

Integrating a machinery monitoring system with a control system typically requires tedious setup of communication links for each measured machine parameter value generated by the machinery monitoring system. For example, in the control system, a data input device must be configured to specify the communication protocol, address the appropriate data registers, define data tag names, specify the data format types, perform appropriate scaling, assign data units, define alarm limits, and specify alarm priorities. This configuration process, which in the past has been performed manually, introduces human error and inconsistencies that can render the performance of the control system and the machinery monitoring system less than adequate.

What is needed, therefore, is a means to automatically configure a control system to provide seamless integration between the control system and a machinery monitoring system.

SUMMARY

The above and other needs are met by a method performed by one or more computer processors for importing data from a machinery monitoring system into a control system. The machinery monitoring system is a system that measures one or more machine measurement parameters of a machine, and the control system is a system that controls one or more processes in which the machine performs a function. According to one embodiment, the method includes the following steps:

(a) accessing a first knowledge base containing information about communicating with the machinery monitoring system;

(b) accessing a second knowledge base containing information about communicating with the control system;

(c) extracting configuration information from the machinery monitoring system via a communication bus;

(d) entering information to be used in creating an import configuration file to be used in preparing the control system to receive data from the machinery monitoring system, where the entering of information is performed via a user interface operatively connected to the one or more computer processors;

(e) based on the information accessed from the first and second knowledge bases in steps (a) and (b), and the configuration information extracted from the machinery monitoring system in step (c), and the information entered in step (d), creating the import configuration file to be used in preparing the control system to receive data from the machinery monitoring system; and (f) transferring data from the machinery monitoring system into the control system based on the import configuration file.

In another aspect, the invention provides a method performed by one or more computer processors for importing data from a first processor-controlled system associated with a machine into a second processor-controlled control system associated with the machine. Preferably, one or both of the first and second processor-controlled systems measure operational parameters of the machine or control a process in which the machine performs a function. According to one embodiment, the method includes the following steps:

(a) accessing a first knowledge base containing information about communicating with the first processor-controlled system;

(b) accessing a second knowledge base containing information about communicating with the second processor-controlled system;

(c) extracting configuration information from the first processor-controlled system via a communication bus;

(d) entering information to be used in creating an import configuration file to be used in setting up the second processor-controlled system to receive data from the first processor-controlled system, wherein the entering of information is performed via a user interface operatively connected to the one or more computer processors;

(e) based on the information accessed from the first and second knowledge bases in steps (a) and (b), and the configuration information extracted from the first processor-controlled system in step (c), and the information entered in step (d), creating the import configuration file to be used in preparing the second processor-controlled system to receive data from the first processor-controlled system; and (f) transferring data from the first processor-controlled system into the second processor-controlled system based on the import configuration file.

In a first embodiment, the first processor-controlled system is a machinery monitoring system and the second processor-controlled system is a control system or other type of system. In a second embodiment, the first processor-controlled system is a control system and the second processor-controlled system is a machinery monitoring system or other type of system. In a third embodiment, the first and second processor-controlled systems are both machinery monitoring systems. In a fourth embodiment, the first and second processor-controlled systems are both control systems. In a fifth embodiment, the first and second processor-controlled systems are systems other than machinery monitoring systems or control systems.

In yet another aspect, the invention provides a computer-readable medium containing computer-executable instructions for execution by one or more computer processors to import data from a machinery monitoring system into a control system. Preferably, the machinery monitoring system is a system that measures one or more machine measurement parameters of a machine, and the control system is a system that controls one or more processes in which the machine performs a function. The computer-executable instructions include:

first instructions for controlling one or more of the computer processors to access a first knowledge base containing information about communicating with the machinery monitoring system;

second instructions for controlling one or more of the computer processors to access a second knowledge base containing information about communicating with the control system;

third instructions for controlling one or more of the computer processors to extract configuration information from the machinery monitoring system via a communication bus;

fourth instructions for controlling one or more of the computer processors to receive user entry of information to be used in creating an import configuration file to be used in preparing the control system to receive data from the machinery monitoring system, where the user entry of information is performed via a user interface operatively connected to one or more of the computer processors;

fifth instructions for controlling one or more of the computer processors to create the import configuration file to be used in preparing the control system to receive data from the machinery monitoring system, where the creation of the import configuration file is performed based on the information accessed from the first and second knowledge bases, and the configuration information extracted from the machinery monitoring system, and the information entered by the user; and sixth instructions for controlling one or more of the computer processors to transfer data from the machinery monitoring system into the control system based on the import configuration file.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
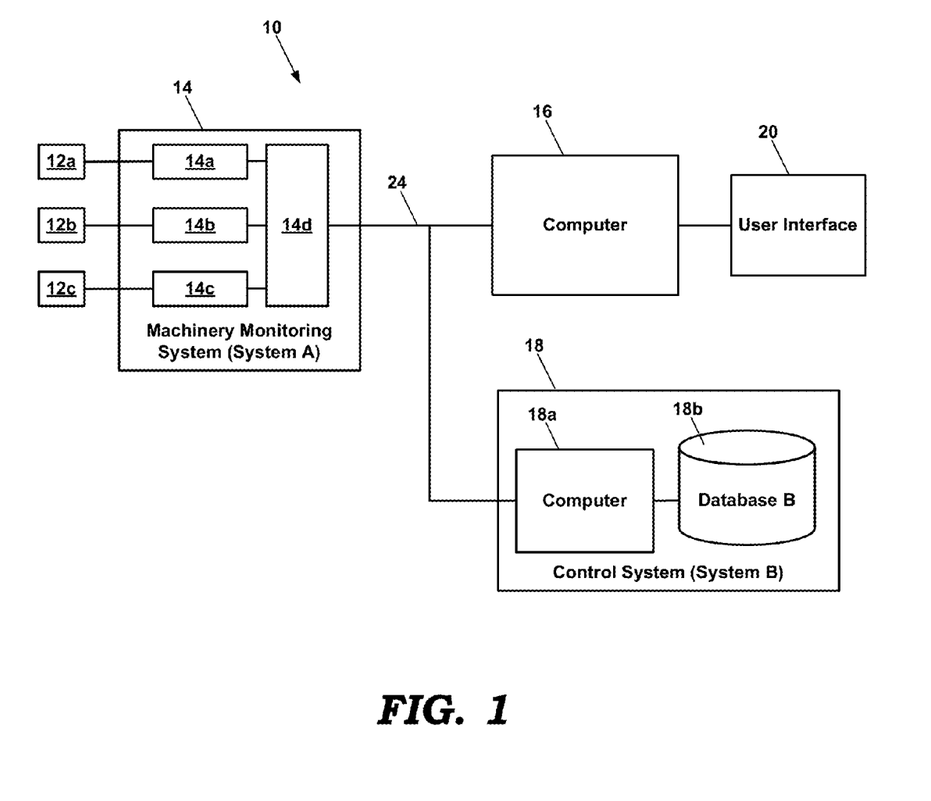
FIG. 1 depicts a machinery monitoring system integrated with a control system.

FIG. 1 depicts a machine monitor and control system 10 which includes a machinery monitoring system 14 (also referred to herein as a "first system" or "system A"). The machinery monitoring system 14 receives sensor input signals from multiple sensors 12a-12c attached to a machine. The primary function of the machinery monitoring system 14 is to measure and monitor performance parameters of one or more machines, such as in an industrial setting. The CSI 6000 series of machine health monitors offered by CSI Technologies, Inc. are examples of machinery monitoring systems. The sensors 12a-12c may measure vibration, displacement, temperature, pressure, electrical flux, and other performance parameters of the machine or machines to which they are attached.

In one preferred embodiment, the machinery monitoring system includes monitor units 14a-14c which receive analog sensor signals from the sensors 12a-12c, filter and adjust the gain of the sensor signals, and convert the analog sensor signals to digital sensor signals. A communication module 14d receives the digital sensor signals from the monitor units 14a-14c and formats the signals for communication via a communication bus 24, such as an Ethernet link, to a personal computer 16.

The personal computer 16 receives and analyzes the sensor signals from the machinery monitoring system 14 to monitor machine performance and trends, and to detect machine faults. A user interface 20 (such as a keyboard, mouse, and display screen) allows an operator to view and manipulate the machine performance data.

The system 10 also includes a control system 18 (also referred to herein as a "second system" or "system B") that controls machines, such as in an industrial plant. The typical control system 18 controls actuators, switches, valves, and other control devices that affect the operation of one or more machines that are performing an industrial process. The DeltaV™ distributed control system offered by Emerson Process Management is one example of a control system 18. In a preferred embodiment, the control system 18 is also in communication with the computer 16. Preferably, the control system 18 includes a computer 18a and a database 18b that stores sensor data received from the machinery monitoring system 14.

Various embodiments are described herein of a software program executed on a computer, such as the computer 16, which scans a first system, such as the machinery monitoring system 14, to determine how it is configured, and uses the configuration information to create an import configuration file to be used in importing data from the first system into a second system, such as the control system 18. Under control of the program, the user interface 20 allows an operator to select values for importing data into the second system, to select where the imported values will be stored within the database 18b of the second system, and to define other key parameters such as alarm priorities to be used in the second system. Based on the scanned configuration data, the user selections, and programmed inference logic, the software program then creates the import configuration file for the second system. When loaded into the second system, this file is used to configure the second system to download the data values from the first system.

When this program is used to link a machinery monitoring system to a control system, the program automates approximately 100 manual steps that would otherwise be required for configuring each data value in the control system. These steps include (1) adding the configuration of the machinery monitoring system communication module to the control system database; (2) enabling communication ports and selecting and configuring the communication protocol; (3) specifying the network/bus address of the machinery monitoring system's communication module; (4) creating entries for each measurement value in the control system database, including an ID tag, a register address, data type, scaling factor, data units label, and any other required special processing such as byte order swapping or metric to English units conversion; and (5) assigning and dynamically linking alarm limits and priorities so that changes in the machinery monitoring system will automatically be updated in the control system. In addition to main data values, additional values can be configured such as alarm states, channel fault states, relay states, etc.

If the machinery monitoring system descriptive text strings are longer than the control system measurement ID tags, some embodiments of the program create a short ID tag (for example as the name of a control module) and the additional text string(s) are imported as separate data values within the same control module. Graphical templates are linked at the control module level, and use a standard naming convention to automatically link to and display all of the various long descriptions.

Although preferred embodiments of the program described above are executed on the computer 16, it will be appreciated that the program may also be executed on a computer which is part of the machinery monitoring system 14 or the computer 18b which is part of the control system 18. Thus, the invention is not limited to any particular computer or processor on which the program is executed.

One skilled in the art will appreciate that System A 14 of FIG. 1 may be a system other than a machinery monitoring system. For example, System A 14 may be a control system or other type of system altogether. Further, it should be appreciated that System B 18 of FIG. 1 may be a system other than a control system. For example, System B 18 may be a machinery monitoring system or other type of system altogether. Thus, the invention is not limited to any particular type of system for System A 14 or System B 18.

Figure 2:
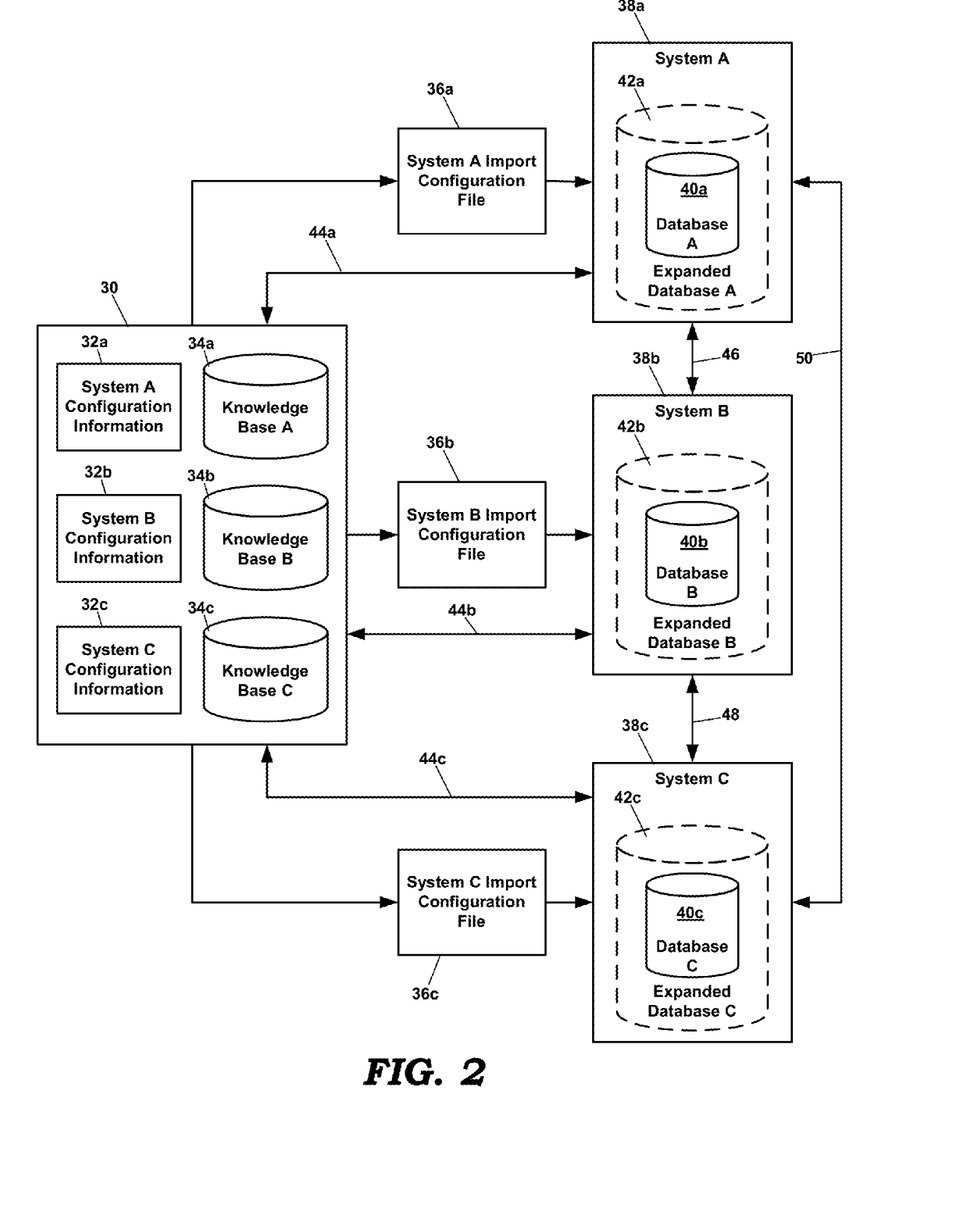
FIG. 2 depicts a system for automatically and efficiently integrating multiple systems connected by a communication bus for providing well integrated communications.

As shown in FIG. 2, a preferred embodiment provides a computer program 30 for automatically configuring multiple systems, such as System A 38a, System B 38b, and System C 38c, to communicate with each other and exchange data via a communication network. For example, System A 38a may be a machinery monitoring system and Systems B and C 38b-38c may both be control systems, though from different manufacturers which implement different standards/protocols for data import. In another example, Systems A and B 38a-38b may both be machinery monitoring systems, though from different manufacturers which implement different data storage standards, and System C 38c may be a control system. In yet another embodiment, System C 38c may be a standardized, nonproprietary system.

The program 30 includes, or has access to, knowledge bases which contain detailed generic configuration information for each system that is to be configured for communication over the communication network. In this context, "generic configuration information" for System A means configuration information which may be provided in a user manual for System A that applies generally to any installation of System A in a machine monitoring or control application, and is not limited to particular parameters that have been set up for or which apply to a particular machine monitoring or control application. In the embodiment of FIG. 2, these include Knowledge Base A 34a, Knowledge Base B 34b, and Knowledge Base C 34c, which contain generic configuration information for Systems A, B, and C 38a-38c, respectively. The generic configuration information provided in the Knowledge Bases A, B, and C 38a-38c may also be derived from other sources such as "readme.txt" files, source code notes, product support documentation, product support or engineering support dialog, and structure gleaned from studying exported database structures.

As described in more detail below, the program 30 produces installation-specific system configuration information 32a-32c for each of the Systems A, B, and C 38a-38c, based on specific configuration information the program retrieves from the Systems A, B, and C 38a-38c and based on generic configuration information provided in the Knowledge Bases A, B, and C 34a-34c. In the embodiment of FIG. 2, the program 30 produces System A configuration information 32a, System B configuration information 32b, and System C configuration information 32c. To generate the System A configuration information 32a, for example, the program 30 scans the configuration of System A via a communication link 44a. Systems B and C may be scanned via communication links 44b and 44c, respectively.

As shown in the embodiment of FIG. 2, the Systems A, B, and C 38a-38c have initial structures for Databases A, B, and C 40a-40c, respectively. These initial structures define data that the database of each System A, B, and C is capable of receiving and integrating before these database structures are altered to receive and integrate other data as defined by system import configuration files 36a-36c. The altered structures for Databases A, B, and C 42a-42c define data that the database of each System A, B, and C is capable of receiving and integrating after these database structures are altered to receive and integrate other data as defined by the system import configuration files 36a-36c.

In the following generalized example, the Database B 40b of System B 38b is altered or expanded to receive and integrate data collected by System A and transferred directly from System A to System B via a communication link 46. For example, System A 38a may be a machinery monitoring system having data collection modules for collecting sensor data from sensors attached to a machine. In this example, System B 38b may be a control system that uses data collected by System A 38a in controlling a process that involves the machine monitored by System A. The program 30 first scans System A via the communication link 44a to determine the specific configuration of the data collection modules of System A. The program 30 uses the specific scanned configuration data from System A, the generic configuration information for System A accessed from the Knowledge Base A 34a, and the generic configuration information for System B accessed from the Knowledge Base B 34b to create a System A-to-B import configuration file 36b. Based on the System A-to-B import configuration file 36b, System B creates the expanded/altered structure for Database B 42b in order to receive and integrate the data from System A transferred over the communication link 46.

Figure 3:
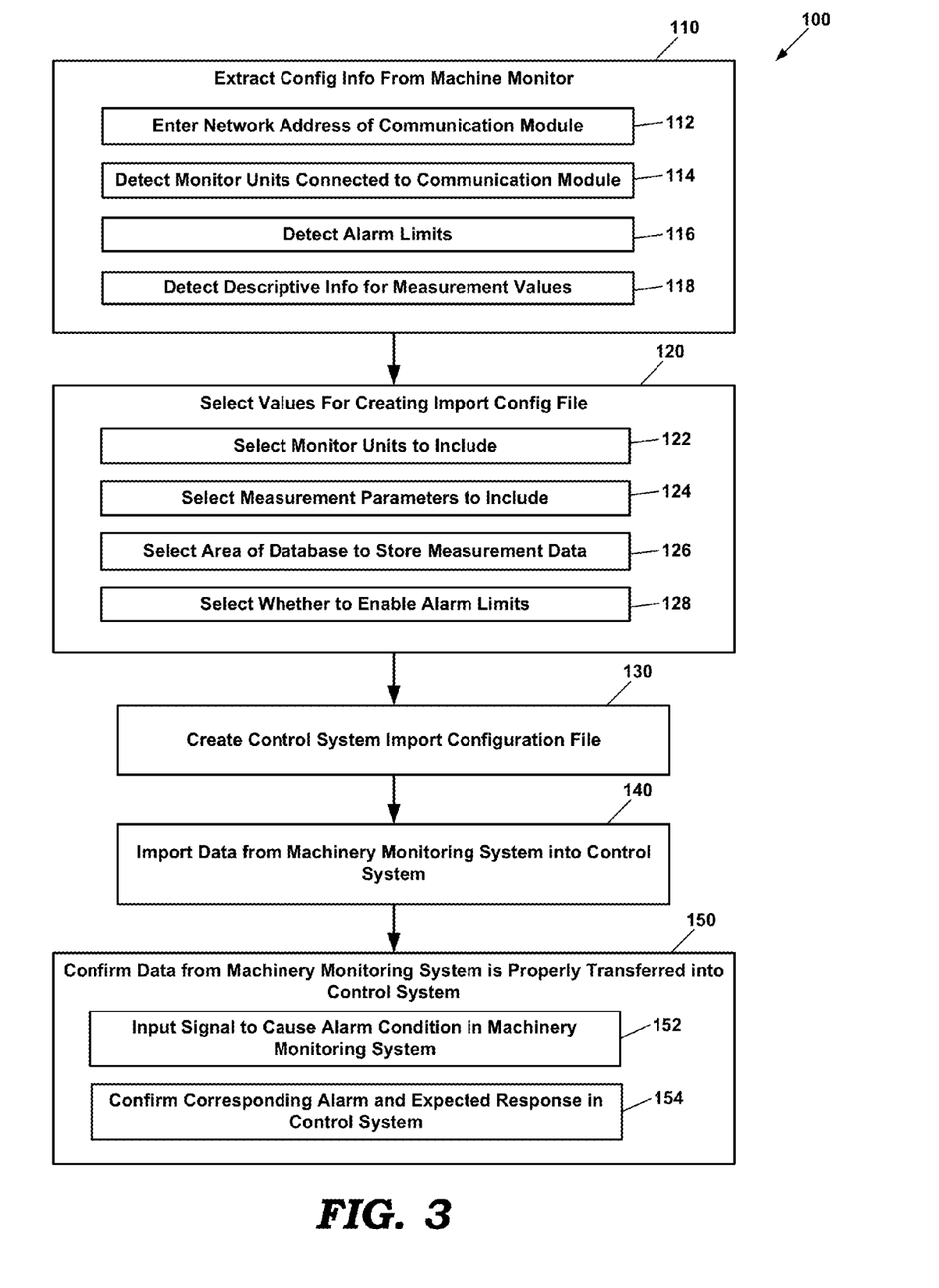
FIG. 3 depicts a method for automatically and efficiently integrating multiple systems connected by a communication bus for providing well integrated communications.

With reference to FIGS. 1 and 3, an embodiment is described wherein System A 14 is a CSI 6500 machinery monitoring system manufactured by CSI Technologies, Inc., System B 18 is a DeltaV™ distributed control system manufactured by Emerson Process Management, and the program 30 (FIG. 2) is executed on a personal computer 16 that communicates with System A and System B via an Ethernet communication bus 24. The process 100 depicted in FIG. 3 is performed by the program 30 in five general phases: extraction of specific configuration information from System A (step 110), user input of information needed for creation of the System A-to-B import configuration file (step 120), creation of the System A-to-B import configuration file (step 130), importation of data from System A to System B (step 140), and confirmation of proper data transfer from System A to System B (step 150).

Figure 4A:
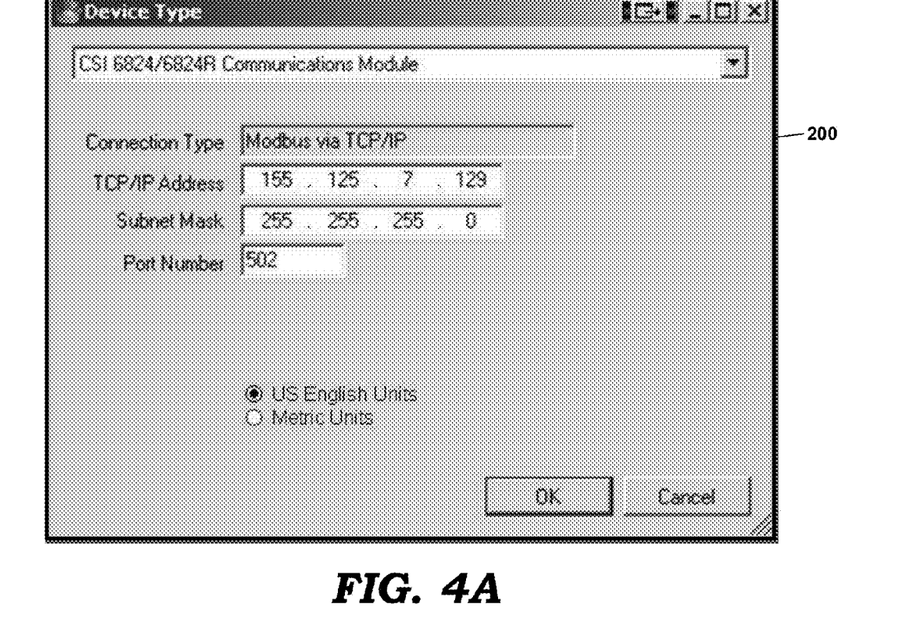
FIGS. 4A-4M depict examples of dialog boxes displayed on a user interface screen for entering information used by a computer program that automatically and efficiently integrates multiple systems connected by a communication bus to provide well integrated communications.
Figure 4B:
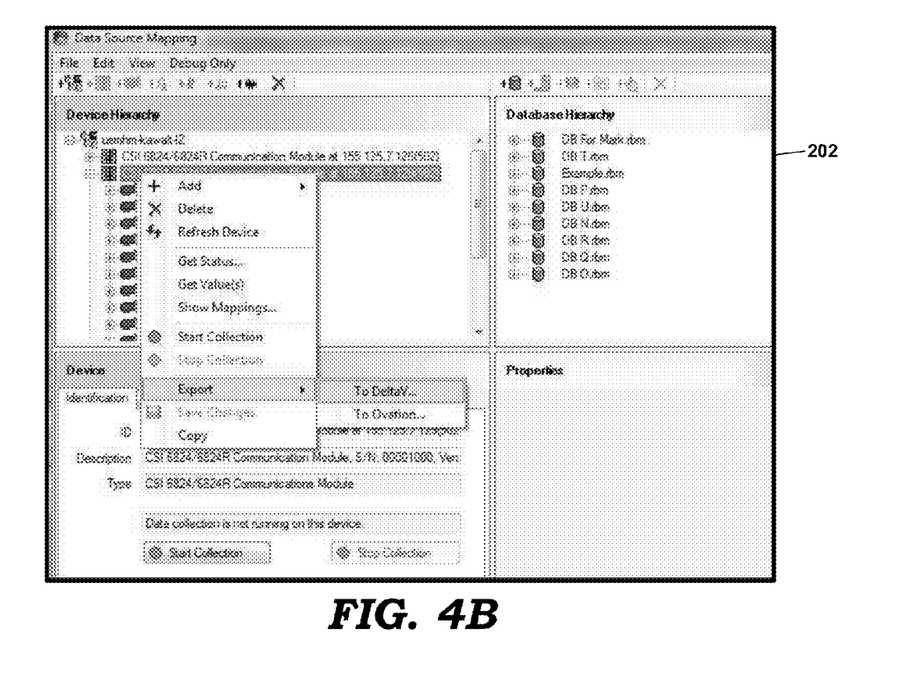

In a preferred embodiment, the extraction phase 110 begins with the user entering the IP address of the communication module 14d (FIG. 1) which in the present example is a CSI 6824 communication module (step 112). FIG. 4A depicts an example of a dialog box such as may be displayed on the user interface 20 for entry of this information, along with selection of English or Metric units. Upon clicking the OK button, the program 30 scans the communication module 14d to detect each monitor unit 14a-14c connected to the communication module 14d (step 114). After scanning the communication module 14d, the program 30 displays an identifier for the communication module 14d and a listing of monitor units 14a-14c that are connected to the scanned communication module 14d. As shown in the dialog box 202 depicted in FIG. 4B, a user may then right click on the displayed communication module identifier and click Export to DeltaV. As part of the data extraction process, the program 30 preferably detects alarm limits that have been set for each monitor unit 14a-14c (step 116) and detects descriptive information for each measurement value associated with the detected monitor units 14a-14c (step 118).

Figure 4C:
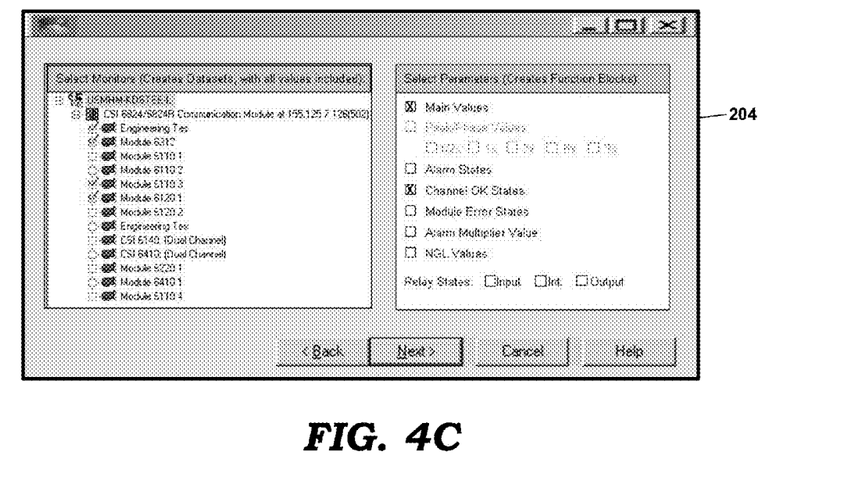

With continued reference to FIG. 3, the user input phase 120 includes a selection by the user of which of the monitor units 14a-14c to include in the import configuration file (step 122). FIG. 4C depicts an example of a dialog box 204 generated by the program 30 to allow the user to make this selection. In a preferred embodiment of the program 30, control modules are imported for each selected monitor unit 14a-14c, and each control module contains function blocks for each selected parameter type. The user may also use the box 204 depicted in FIG. 4C to select which parameter types to include in the import configuration file (step 124).

Figure 4D:
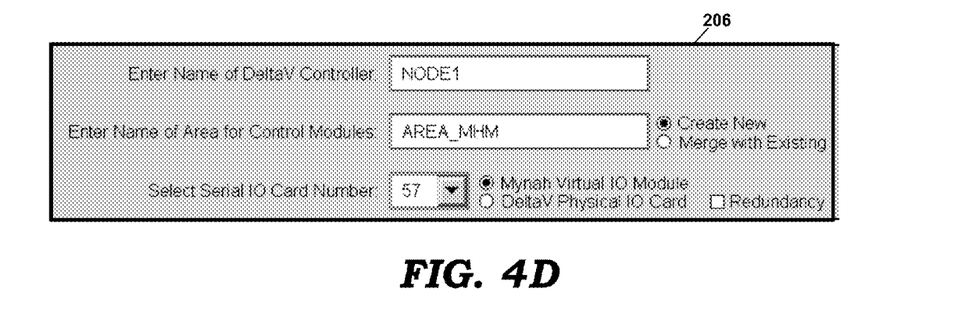

FIG. 4D depicts an example of a dialog box 206 generated by the program 30 to allow entry of a name for the control system node into which the control modules will be imported, entry of a name for the area of the control system database 18b into which the control modules will be imported, and a selection of whether a new area of the database 18b is to be created or if the imported control modules are to be merged into an existing area (step 126).

Figure 4E:
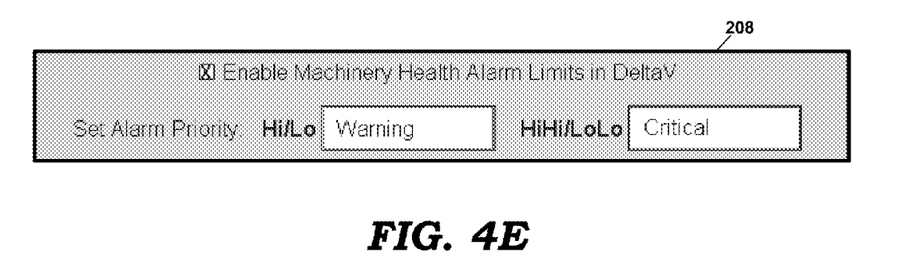
Figure 4F:
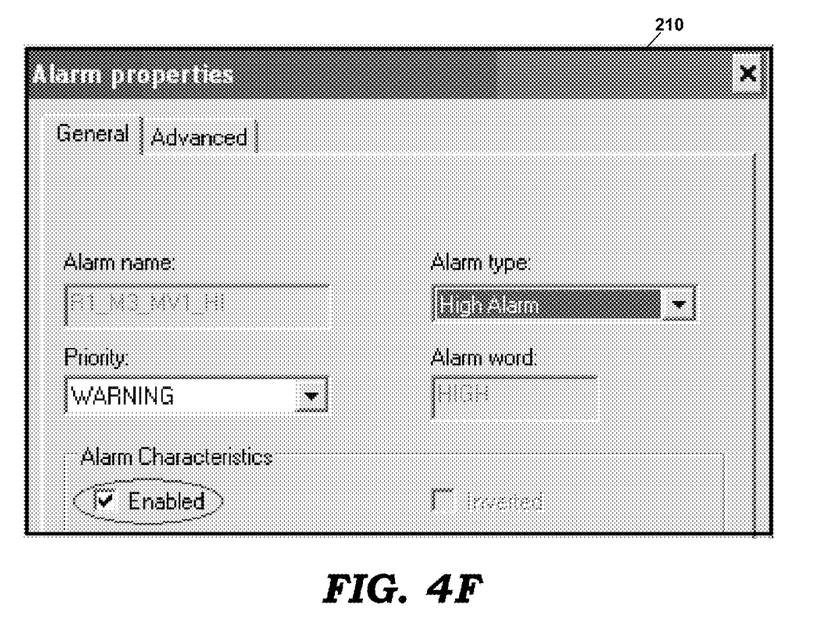

In a preferred embodiment, alert and danger alarm limits for each imported parameter are transferred from the machinery monitoring system 14 to the function blocks of the control system 18 during the import process. FIG. 4E depicts a dialog box 208 generated by the program 30 in which a user may specify whether these alarm limits are to be enabled in the control system 18 (step 128). FIG. 4F depicts a dialog box 210 generated by the program 30 in which a user may specify names for alarm priorities to be assigned for alert alarms and danger alarms.

Figure 4G:
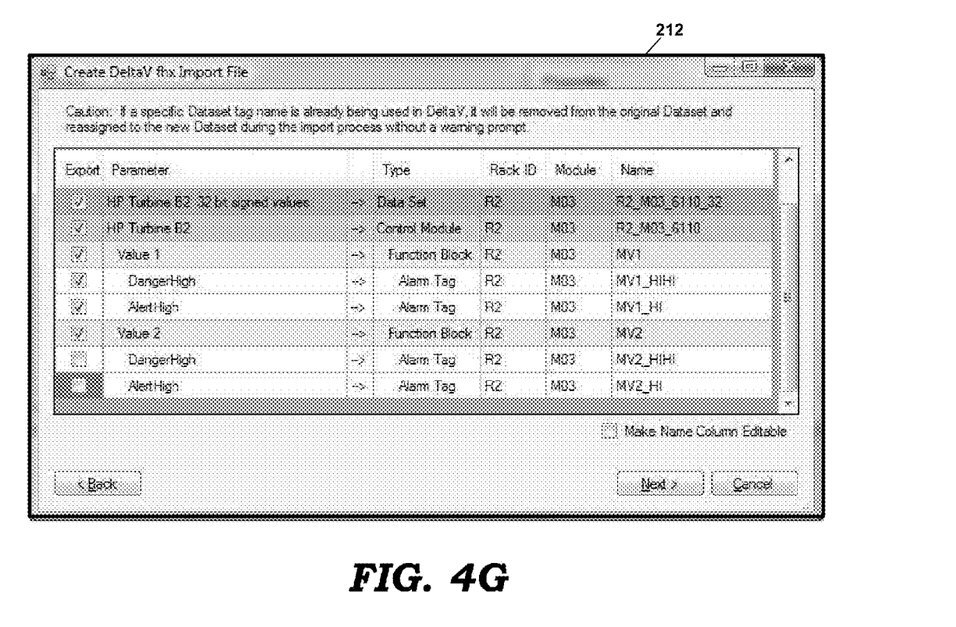

The CSI 6000 series machinery monitoring system 14 of the current example has extensive description information for each measurement value, including 20- and 30-character identification and description fields. The DeltaV™ control system 18 of the current example uses 16-character identification fields for each measurement value. To accommodate these differences, a preferred embodiment of the program 30 automatically creates new default names for datasets, control modules, function blocks, and alarms in the control system 18. Once these names are created, they may be edited by a user using a dialog box 212 such as the example depicted in FIG. 4G.

Based on the system configuration information extracted from the machinery monitoring system 14, information in the knowledge bases for the machinery monitoring system 14 and the control system 18, and the selections and input provided by the user, the program 30 creates the import configuration file for the control system 18 (which is referred to as a .fhx file in the DeltaV™ control system) (step 130 in FIG. 3). Preferably, this includes creation of a control module for each selected monitor unit. In one embodiment, the import configuration file is then copied from the computer 16 to the control system computer 18a.

Figure 4H:
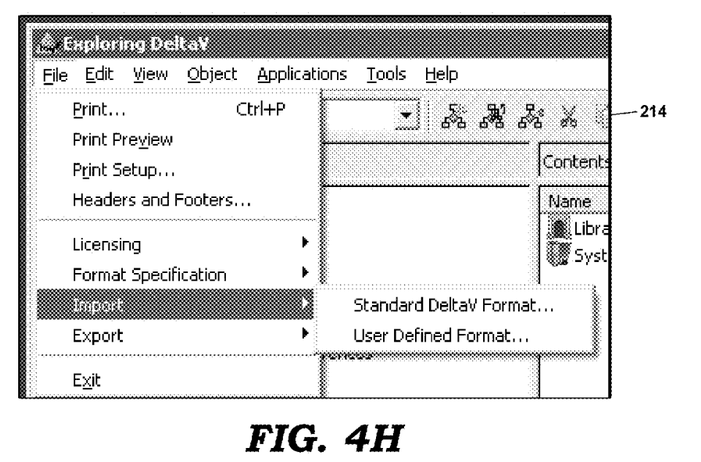
Figure 4I:
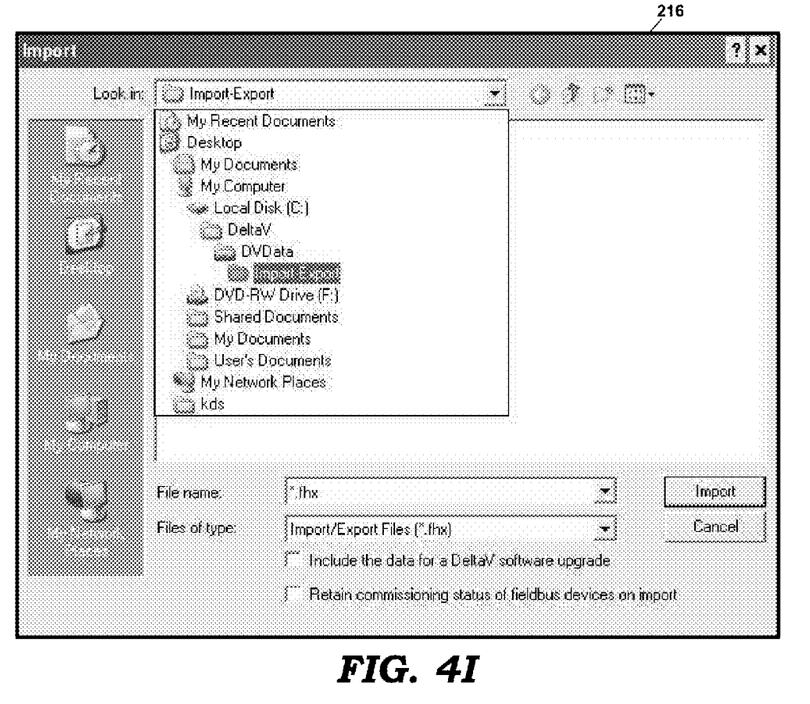
Figure 4J:
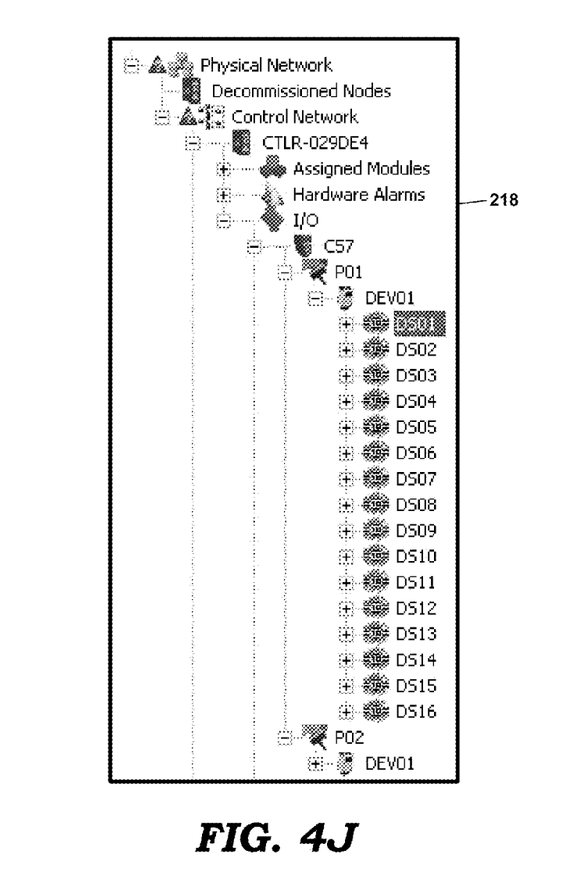
Figure 4K:
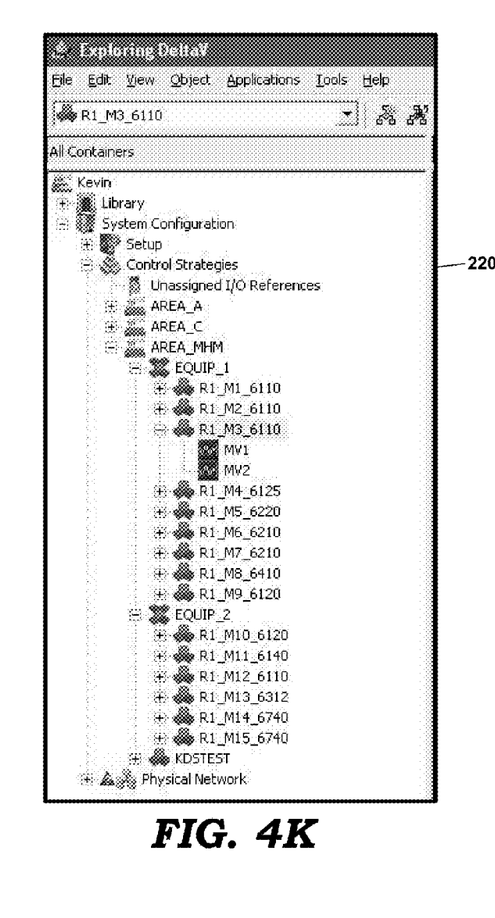
Figure 4L:
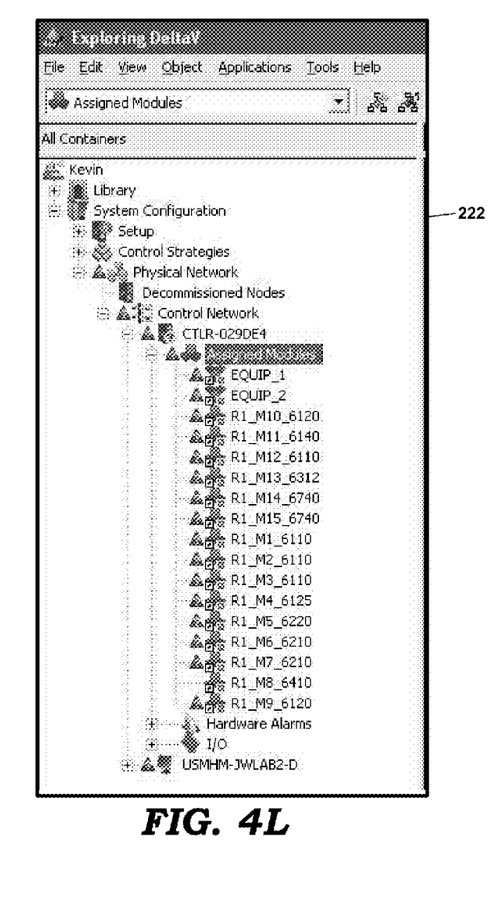
Figure 4M:
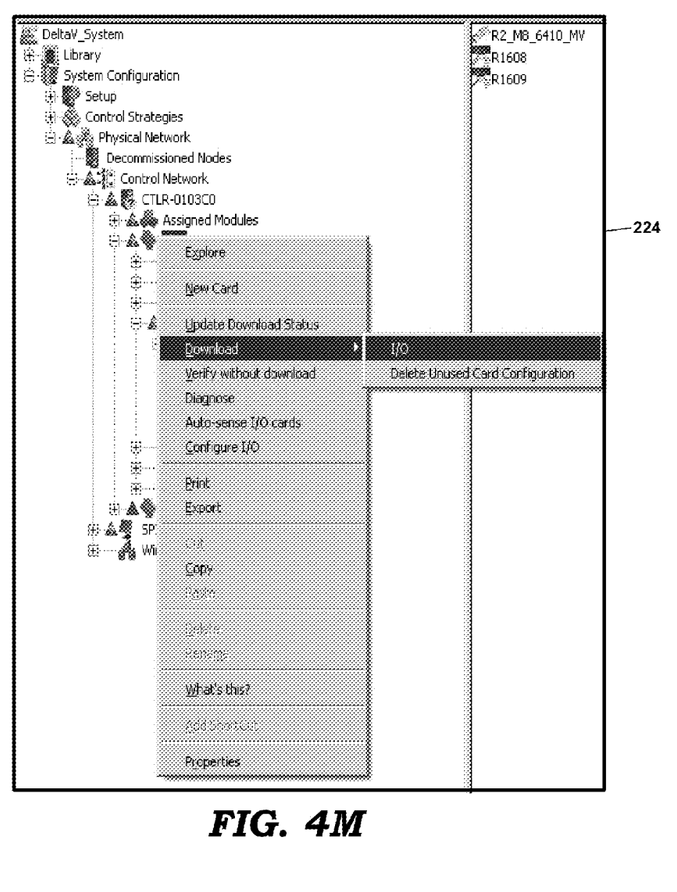

FIGS. 4H and 4I depict example dialog boxes 214 and 216 generated by a DeltaV™ control system to allow a user to select an Import option (FIG. 4H) and then find and select the import configuration file (FIG. 4I). When the user clicks on Import, the DeltaV™ control system uses the import configuration file to create the serial I/O cards, ports, channels, and datasets, and to assign them to a specified controller (step 140 of FIG. 3). As shown in the example file structure 218 of FIG. 4J, the DeltaV™ system creates a 32-bit dataset for each selected CSI 6000 monitor unit with Main Values selected. A 16-bit dataset is also created for each selected CSI 6000 monitor with any 16-bit values selected. A 16-bit dataset is also created for each relay module selected. A total of up to twenty-eight datasets may be created for a fully populated CSI 6500 rack. Using virtual serial cards allows the datasets to span two serial ports (whereas with physical cards, only one port can be used, for a total of 16 datasets from one CSI 6824 communication module). As shown in the example file structure 220 of FIG. 4K, the DeltaV™ system also creates control modules with function blocks for each selected measurement value. This is used for scaling the measurement values, defining alarm limits, and assigning a meaningful tag name to each value. As shown in the example file structure 222 of FIG. 4L, the control modules are also automatically assigned to the specified controller. As shown in the example file structure 224 of FIG. 4M, in the DeltaV™ system, a user selects "Download" from the DeltaV™ Explorer tool bar to download the data from the control system database to the controller.

To confirm that data from the machinery monitoring system 14 is being properly transferred to the control system 18 (step 150 in FIG. 3), a controlled input signal may be provided to the machinery monitoring system 14 (step 152), such as a signal that causes a particular alarm condition in the machinery monitoring system 14, and the control system 18 is observed to confirm that a corresponding and expected response occurs (step 154).

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method performed by one or more computer processors for importing data from a machinery monitoring system into a control system, the method comprising:
    (a) receiving configuration information regarding a data storage structure in the machinery monitoring system and information about communicating with the machinery monitoring system;
    (b) receiving configuration information regarding a data storage structure in the control system and information about communicating with the control system;
    (c) entering information to be used in creating a control system configuration file, which file is to be used in preparing the control system to receive data from the machinery monitoring system, the entering performed via a user interface operatively connected to the one or more computer processors, the entering including:
        selecting one or more machine monitor units of the machinery monitoring system to include in the control system configuration file;
        selecting machine measurement parameters to include in the control system configuration file;
        selecting an area within a control system database into which machine measurement data is to be imported; and
        selecting whether to enable alarm limits in the control system that are transferred from the machinery monitoring system;
    (d) based on the information received in steps (a) and (b) and the information entered in step (c), creating the control system configuration file to be used in preparing the control system to receive data from the machinery monitoring system; and
    (e) based on the control system configuration file, transferring data from the machinery monitoring system into the control system.

2. A method performed by one or more computer processors for importing data from a machinery monitoring system into a control system, the method comprising:
    (a) receiving configuration information regarding a data storage structure in the machinery monitoring system and information about communicating with the machinery monitoring system;
    (b) receiving configuration information regarding a data storage structure in the control system and information about communicating with the control system;
    (c) entering information to be used in creating a control system configuration file, which file is to be used in preparing the control system to receive data from the machinery monitoring system, the entering performed via a user interface operatively connected to the one or more computer processors;
    (d) based on the information received in steps (a) and (b) and the information entered in step (c), creating the control system configuration file to be used in preparing the control system to receive data from the machinery monitoring system; and
    (e) based on the control system configuration file, transferring data from the machinery monitoring system into the control system, the transferring including:
        creating one or more datasets into which machine measurement data from one or more machine monitor units of the machinery monitoring system are to be transferred;
        applying scaling to the transferred data for one or more of the machine measurement parameters;
        defining alarm limits for the transferred data for one or more of the machine measurement parameters; and
        assigning a name for one or more of the machine measurement parameters.

3. A method performed by one or more computer processors for importing data from a machinery monitoring system into a control system, wherein the machinery monitoring system measures one or more machine measurement parameters of a machine and the control system controls one or more processes in which the machine performs a function, the method comprising:
    (a) receiving generic configuration information regarding a data storage structure in the machinery monitoring system and information about communicating with the machinery monitoring system;
    (b) receiving generic configuration information regarding a data storage structure in the control system and information about communicating with the control system;
    (c) extracting installation-specific configuration information from the machinery monitoring system via a communication bus;
    (d) entering information to be used in creating an import configuration file, which file is to be used in preparing the control system to receive data from the machinery monitoring system, the entering performed via a user interface operatively connected to the one or more computer processors;
    (e) based on the generic configuration information received in steps (a) and (b), the installation-specific configuration information extracted from the machinery monitoring system in step (c), and the information entered in step (d), creating the import configuration file to be used in preparing the control system to receive data from the machinery monitoring system; and
    (f) based on the import configuration file, transferring data from the machinery monitoring system into the control system.

4. A method performed by one or more computer processors for importing data from a first processor-controlled system associated with a machine into a second processor-controlled system associated with the machine, wherein one or both of the first and second processor-controlled systems measure operational parameters of the machine or control a process in which the machine performs a function, the method comprising:
    (a) receiving generic configuration information regarding a data storage structure in the first processor-controlled system and information about communicating with the first processor-controlled system;
    (b) receiving generic configuration information regarding a data storage structure in the second processor-controlled system and information about communicating with the second processor-controlled system;

(c) extracting installation-specific configuration information from the first processor-controlled system via a communication bus;

(d) entering information to be used in creating an import configuration file, which file is to be used in setting up the second processor-controlled system to receive data from the first processor-controlled system, the entering of information performed via a user interface operatively connected to the one or more computer processors;

(e) based on the generic configuration information received in steps (a) and (b), and the installation-specific configuration information extracted from the first processor-controlled system in step (c), and the information entered in step (d), creating the import configuration file to be used in preparing the second processor-controlled system to receive data from the first processor-controlled system; and (f) based on the import configuration file, transferring data from the first processor-controlled system into the second processor-controlled system.

5. The method of claim 4 wherein the first processor-controlled system is selected from the group consisting of a machinery monitoring system and a control system.

6. The method of claim 4 wherein the second processor-controlled system is selected from the group consisting of a machinery monitoring system and a control system.

7. A computer-readable medium containing computer-executable instructions for execution by one or more computer processors to import data from a machinery monitoring system into a control system, wherein the machinery monitoring system measures one or more machine measurement parameters of a machine and the control system controls one or more processes in which the machine performs a function, the instructions including:

first instructions for controlling one or more of the computer processors to receive generic configuration information regarding a data storage structure in the machinery monitoring system and information about communicating with the machinery monitoring system;

second instructions for controlling one or more of the computer processors to receive generic configuration information regarding a data storage structure in the control system and information about communicating with the control system;

third instructions for controlling one or more of the computer processors to extract installation-specific configuration information from the machinery monitoring system via a communication bus;

fourth instructions for controlling one or more of the computer processors to receive user entry of information for use in creating an import configuration file, which file is for use in preparing the control system to receive data from the machinery monitoring system, wherein the user entry of information is performed via a user interface operatively connected to one or more of the computer processors;

fifth instructions for controlling one or more of the computer processors to create the import configuration file for use in preparing the control system to receive data from the machinery monitoring system, wherein the creation of the import configuration file is performed based on the information received by execution of the first and second instructions, the installation-specific configuration information extracted from the machinery monitoring system, and the information entered by the user; and sixth instructions for controlling one or more of the computer processors to transfer data from the machinery monitoring system into the control system based on the import configuration file.

\* \* \* \* \*